United States Patent Office 3,008,961
Patented Nov. 14, 1961

3,008,961
CYANURIC ACID MANUFACTURE
Bruno H. Wojcik, Ruxton, Md., assignor to Olin Mathieson Chemical Corporation, a corporation of Virginia
No Drawing. Filed May 25, 1959, Ser. No. 815,324
3 Claims. (Cl. 260—248)

This invention relates to the production of cyanuric acid from urea.

It is well known that cyanuric acid is produced when urea or biuret is heated. Several processes have been devised whereby high yields of relatively pure cyanuric acid can be produced from urea. Two recently published methods are those of U.S. Patents 2,822,363 and 2,872,447 wherein the urea or biuret is dissolved in a phenolic solvent or a substituted lower acyl amide respectively. In these processes the solution is heated causing the urea or biuret to transform into cyanuric acid and to precipitate. In both of these processes the product is recovered by filtering the reaction medium. The filtrate is refreshed with urea or biuret and returned to the reactor.

The novel process of the present invention differs from those above in that tetrahydrofurfuryl alcohol and/or the reaction product of urea or biuret and tetrahydrofurfuryl alcohol is used as the reaction medium. It has been surprisingly discovered that the rate of conversion of urea to cyanuric acid is considerably improved over prior processes by using this heterocyclic alcohol and its reaction product with urea or biuret as the solvent. This invention produces a purer product in a higher final yield at a faster rate than prior processes.

According to this invention biuret or urea is mixed with tetrahydrofurfuryl alcohol and heated. The temperature of the alcohol should be about 150° C. to 177° C., its reflux temperature. As the urea is added it appears to react with the alcohol. Up to one mole of urea may be consumed per mole of the alcohol. Further addition of urea results in the precipitation of cyanuric acid. The latter is separated from the reaction mixture, for example, by filtering, the urea-alcohol reaction product returned to the reactor and the steps repeated. In a continuous operation, the urea is continuously added to the reaction mixture while a portion of the latter is continuously removed, filtered and returned to the reactor. The reaction mixture of urea and the alcohol reflux at about 215° C. It is preferred to carry out the reaction at 175° to 225° C. although temperatures as low as about 150° C. and as high as 250° C. are suitable.

A further advantage of this invention is that much less ammonium carbamate is formed than with other solvents, especially with straight chain alcohols. This carbamate is especially troublesome because it sublimes in condensers and other cool parts of the apparatus. Upon subliming it forms a tough cake whereupon operation of the process must be interrupted to clean the equipment.

The following examples illustrate preferred embodiments of my invention:

*Example I*

A three-necked flask heated with a mantle was equipped with a stirrer and reflux condenser in two of the necks. The by-product ammonia left the system through the condenser. The third neck was used to feed urea to the reaction mixture. In the flask was placed 4 gram moles of tetrahydrofurfuryl alcohol which was heated to reflux, 177° C. Six gram moles of urea was added to the refluxing alcohol over a 5 hour period at the end of which time the mixture was refluxing at 215° C. After this period the mixture was cooled and filtered. The filtrate was returned to the flask and the cyanuric acid product (cycle A in the table below) was weighed and analyzed. The filtrate was then heated to about 180° C. and the additional urea indicated for cycle B was added. The temperature rose slowly while the bulk of the ammonia was driven off after which time (about 15 minutes) the temperature reached 215° C. and remained there throughout most of the reaction period. The batch process described here was put through 8 cycles and results are tabulated:

| Cycle | Reaction time minutes | Moles urea added | Yield percent | Analysis percent cyanuric acid |
|---|---|---|---|---|
| A | 300 | 6 | 44 | 97 |
| B | 115 | 2 | 108 | 97 |
| C | 95 | 2 | 88 | 96 |
| D | 100 | 2 | 104 | 96 |
| E | 100 | 2 | 93 | 92 |
| F | 100 | 2 | 97 | 94 |
| G | 100 | 2 | 102 | 93 |
| H | 100 | 2 | 104 | 91 |

The yield in the first run A is very low because a considerable amount of the urea appears to be reacted with the tetrahydrofurfuryl alcohol. After the initial urea investment the average yield per batch was 98%, taking batches C through H. The average purity of the product was over 94%. Several of the yields reported are over 100 percent because the product was not completely removed from the previous run or runs. The rate of conversion of urea after start-up is 59% per hour. The urea initially consumed is converted into cyanuric acid by heating the reaction mixture for about 3 hours with no further urea addition.

*Example II*

This experiment was run with apparatus similar to that used in Example I except that the operation was continuous. The flask contained 4 gram moles of tetrahydrofurfuryl alcohol and was continuously fed with urea at the rate of about one gram mole per hour. Every 2 hours a portion of the reaction mixture was tapped from a stopcock in the bottom of the flask and filtered hot. The filtrate was returned to the reaction flask while the product was washed with methanol and dried. The methanol was distilled from the wash liquid and the residue was returned to the reactor. Throughout the operation a temperature of 200° to 215° C. was maintained in the reaction mixture. This procedure was maintained for 23 hours during which time 23.8 gram moles of urea was added to the mixture along with 100 grams of makeup tetrahydrofurfuryl alcohol. The reactor gave up a total of 5.9 gram moles of cyanuric acid which analysed consistently over 95%. Theoretically, 23.8 moles of urea should produce 7.9 moles of cyanuric acid. The 2 moles not recovered remained as intermediates in the reaction mixture.

The analytical method used to determine the cyanuric acid in the above examples was developed by Ronald Marek and is the subject of copending application, Serial number 815,323, now U.S. Patent 2,986,452, filed on even date herewith. This method comprises precipitating a copper-cyanuric acid complex, separating and redissolving the complex in sulfuric acid, liberating the copper from the complex with potassium iodide and finally titrating the resulting iodine with standard thiosulfate in the presence of starch. Cyanuric acid has previously been determined by simply titrating the sample with a base. However, the number of equivalents consumed is seldom indicative of only the cyanuric acid content. Most prior processes produce a substantial quantity of ammelide as by-product, and this consumes the same proportion of alkali in the titration as cyanuric acid. Simple alkali titration thus does not distinguish between ammelide and cyanuric acid. The copper analysis is specific for cyanuric acid in the commonly produced reaction mixtures containing urea, biuret, ammelide and cyanuric acid.

I claim:
1. A process for the preparation of cyanuric acid which comprises mixing tetrahydrofurfuryl alcohol and a substance selected from the group consisting of urea and biuret, heating the said mixture at 150° C. to 250° C. to produce a reaction mixture containing cyanuric acid and separating cyanuric acid from the reaction mixture, wherein at least one mole of said substance is employed per mole of tetrahydrofurfuryl alcohol.

2. A continuous process for the preparation of cyanuric acid which comprises maintaining at 175° to 225° C. a reaction mixture produced by heating within the said temperature range a mixture of tetrahydrofurfuryl alcohol and a substance selected from the group consisting of urea and biuret, adding further quantities of said substance, withdrawing a minor proportion of the reaction mixture, separating cyanuric acid therefrom and returning the residue to the reaction mixture, wherein at least one mole of said substance is employed per mole of tetrahydrofurfuryl alcohol.

3. A continuous process for the preparation of cyanuric acid which comprises maintaining at reflux temperature a reaction mixture produced by heating within 175° to 225° C. a mixture of tetrahydrofurfuryl alcohol and a substance selected from the group consisting of urea and biuret, adding further quantities of said substance, withdrawing a minor proportion of the reaction mixture, separating cyanuric acid therefrom and returning the residue to the reaction mixture, wherein at least one mole of said substance is employed per mole of tetrahydrofurfuryl alcohol.

References Cited in the file of this patent

UNITED STATES PATENTS

| | | |
|---|---|---|
| 2,822,363 | Christmann et al. | Feb. 4, 1958 |
| 2,872,447 | Oehlschlaeger | Feb. 3, 1959 |
| 2,952,679 | Perret | Sept. 13, 1960 |

FOREIGN PATENTS

| | | |
|---|---|---|
| 506,070 | Canada | Sept. 28, 1954 |
| 936,686 | Germany | Dec. 22, 1955 |

OTHER REFERENCES

Hofmann: Berichte Deutsche Chemische Gesellschaft, vol. 4, page 267 (1871).

Grandiere: Bull. Soc. Chim., France, vol. 35, pages 187 to 196 (1924).

Metayer: Bull. Soc. Chim., France (Series 5), vol. 18, pages 802–6 (1951).

The Merck Index, 6th Ed., page 941, Merck and Co. (1952).

Dunlop et al.: The Furans ACS Monograph Series, No. 119, pages 732–733, Reinhold Publ. Corp., 1953.

The Quaker Oats Co., Bulletin 206, pages 4, 10–11 and 18 to 22 (copyrighted 1956), note pages 18–19 in particular.